US008862688B1

(12) United States Patent
Kalbag

(10) Patent No.: US 8,862,688 B1
(45) Date of Patent: Oct. 14, 2014

(54) DOWNLOADING WEB-BASED EMAIL

(75) Inventor: Rohit Satish Kalbag, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1160 days.

(21) Appl. No.: 10/700,030

(22) Filed: Nov. 3, 2003

(51) Int. Cl.
*G06F 15/16* (2006.01)
*G06Q 10/10* (2012.01)
*G06Q 10/06* (2012.01)
*H04L 12/58* (2006.01)
*G06F 17/22* (2006.01)
*G06F 17/30* (2006.01)
*G06F 3/0481* (2013.01)

(52) U.S. Cl.
CPC .......... *G06Q 10/107* (2013.01); *H04L 51/063* (2013.01); *G06F 17/2264* (2013.01); *H04L 51/08* (2013.01); *G06F 17/30126* (2013.01); *G06F 3/0481* (2013.01); *G06Q 10/06* (2013.01); *G06Q 10/10* (2013.01); *Y10S 707/99936* (2013.01); *Y10S 707/99938* (2013.01); *Y10S 707/9994* (2013.01); *Y10S 707/99942* (2013.01); *Y10S 707/99952* (2013.01)
USPC .......... 709/217; 709/207; 709/206; 709/203; 709/205; 709/216; 715/752; 715/234; 707/999.006; 707/999.008; 707/999.01; 707/999.101; 707/999.201

(58) Field of Classification Search
USPC .................. 709/206, 205, 203, 217; 715/752; 707/10
See application file for complete search history.

(56) References Cited

U.S. PATENT DOCUMENTS

| | | | | |
|---|---|---|---|---|
| 6,078,921 A * | 6/2000 | Kelley | ................................. | 1/1 |
| 6,839,741 B1 * | 1/2005 | Tsai | .............................. | 709/217 |
| 7,035,902 B1 * | 4/2006 | Bates et al. | .................... | 709/206 |
| 7,149,959 B1 * | 12/2006 | Jones et al. | .................... | 715/234 |
| 7,194,513 B2 * | 3/2007 | Sharif et al. | .................... | 709/206 |
| 2002/0105545 A1 * | 8/2002 | Carter et al. | ................... | 345/752 |
| 2003/0046345 A1 * | 3/2003 | Wada et al. | .................... | 709/205 |

OTHER PUBLICATIONS

Terry Gray, Message Access Paradigms and Protocols, http://imap.org/papers/ipmap.vs.pop.html, Aug. 28, 1995 (10 Pages).
Douglas Ludens, Hotmail with Outlook Express, a Niver Way to Hotmail, http://windows.about.com/lbrary/weekly/aa020512a.htm, May 13, 2002 (3 Pages).
Microsoft Outlook Version 2002 (included in Office XP) Product Guide, http://www.microsoft.com/office/outlook/evaluation/OutlkPG.doc, May 30, 2001, 12 Pages).
How to: Create a Mail file (PST) on your Desktop and Move Mail to It, http://www.fullerton.edu/it/helpdesk/pdf/outlook_pst.pdf, Rev. Dec. 7, 2001 (14 pages).

* cited by examiner

*Primary Examiner* — Kyung H Shin

(57) ABSTRACT

Web-based email methods and systems for downloading emails from an email service provider's servers to a user's local system and/or other local storage medium are provided. The user can select the emails to download and the systems and methods can retrieve the selected emails from storage. The text of the emails can be reformatted into a text file. The systems and methods can present a web page to the user from which the email text file can be downloaded. The web page can include attachments to the emails. The text files can be concatenated into a one or more text files and the attachments can be compressed into one or more files. Optionally, the text file(s) and the compressed file(s) can be emailed to an alternate email address. Optionally, the email text and attachments can be formatted for viewing by a local email client.

19 Claims, 2 Drawing Sheets

DOWNLOADING WEB-BASED EMAIL

FIELD

The systems and methods relate to message systems, and more particularly to web-based email systems.

BACKGROUND

Web-based email providers allow users to send, receive and view email using a web browser. These services can provide users with the convenience of accessing their email by simply connecting to the network used by the service provider's hosting servers, or web-mail servers, e.g., by connecting to the Internet. Typically, a user's email can reside on the web-mail servers and, in addition to sending, receiving and viewing emails, the user can move emails between folders maintained on the web-mail servers.

For archiving purposes, the user can move emails to folders on the web-mail servers designated or used by the user as archival folders. However, users may want to archive or back-up emails on their local systems to guard against service provider failures and/or other unintentional or malicious deletion of emails archived at the web-mail servers. For local archiving of emails, the user can print the emails, and/or can copy and paste the emails into documents stored locally. While attachments that can accompany the emails typically can be downloaded to local systems, current web-based email systems do not provide the capability of downloading user emails to local systems.

SUMMARY

Web-based email systems and methods can provide for downloading one or more emails from an email service provider's servers to a user's local system and/or other local storage medium. The user can select the emails to download and the systems and methods can later retrieve the selected emails from the local storage medium. The text of the emails can be reformatted into a text file. The systems and methods can present a web page to the user from which the email text file can be downloaded. The web page can also include attachments to the emails. In one embodiment, the text files can be concatenated and the attachments can be compressed into one or more files. Optionally, the text file and the compressed files can be emailed to an alternate email address. Optionally, the emailed text file and attachments can be formatted for viewing by a local email client.

In one embodiment, a method of transmitting a plurality of emails from a web-based email system can include processing the emails to obtain text files, concatenating the text files to provide a concatenated file, and downloading the concatenated file to a storage medium. The concatenated file can be incorporated on a web page in downloadable form. Attachments to the plurality of emails can also be incorporated on the web page in downloadable form and can be processed to obtain at least one compressed file. The compressed file can be incorporated on the web page in downloadable form. The concatenated file can be formatted for retrieval from the storage medium by an email client application. The concatenated file can be attached to a system generated email and transmitted to one or more email addresses. The compressed file can be attached to the system generated email that can be generated based on a selected format. The system generated email can be modified prior to being transmitted.

In one embodiment, a method of archiving emails can include designating emails to be archived, processing the emails to obtain text files, incorporating the text files on a web page in downloadable form, and downloading the text files to a storage medium. The text files can be concatenated into one or more concatenated files. Attachments to the emails can be incorporated on the web page in downloadable form. The attachments can be compressed to obtain one or more compressed files.

In one embodiment, computer-readable medium can contain instructions for controlling a computer system to transmit emails from a web-based email system. The instructions can control the computer system to process the emails to obtain text files, concatenate the text files into one or more concatenated files, and download the concatenated file(s) to a storage medium. The concatenated file can be incorporated on a web page in downloadable form. Attachments to the emails can be incorporated on the web page in downloadable form. The attachments can be processed to obtain one or more compressed files. The compressed file(s) can be incorporated on the web page in downloadable form. The concatenated file(s) can be attached to a system generated email and transmitted to one or more email addresses. The compressed file(s) can be attached to the system generated email.

In one embodiment, a web-based email application on computer-readable medium can include instructions to transmit emails from storage medium associated with the web-based email application to storage medium associated with a processing system controlled by a user of the web-based email application. The application can transmit emails by processing the emails to obtain text files, incorporating the text files on a web page in downloadable form, and downloading the text files to the storage medium associated with the processing system controlled by the user. The text files can be concatenated into one or more concatenated files. Attachments to the emails can be incorporated on the web page in downloadable form. The attachments can be compressed to obtain one or more compressed files.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Figure 1:
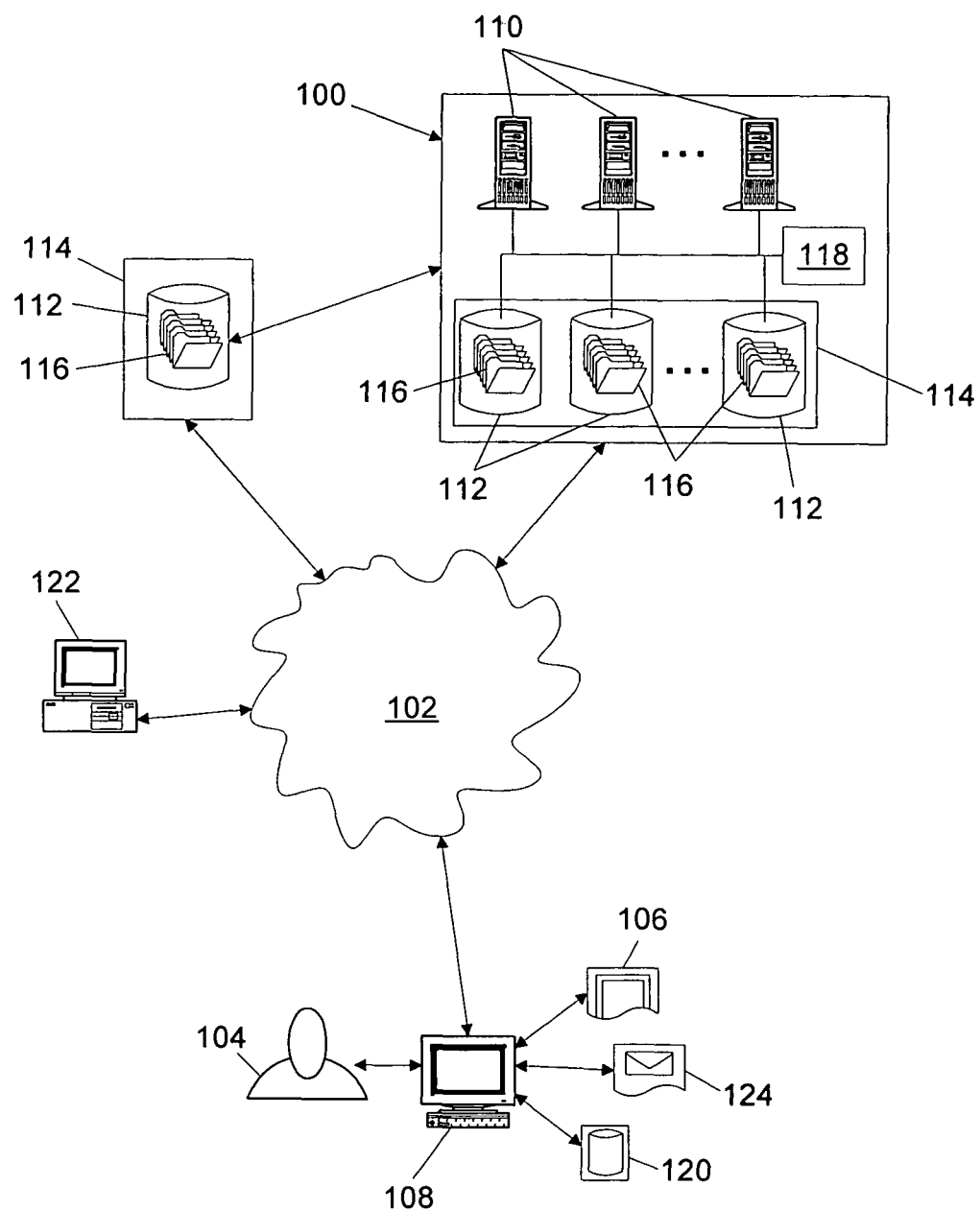
FIG. 1 illustrates a block diagram of a web-based email system having local back-up capabilities.

Referring to FIG. 1, a system, or service provider 100 can be configured for sending, receiving and viewing email on a network 102, such as the Internet or other network as is known in the art. System 100 can connect to network 102 and can provide web-based email services to users, such as user 104. User 104 can access network 102 using web browser 106, or other such application operating on a local system 108 to connect to network 102 for access to system 100. System 100 can include one or more one or more servers 110 that can process email service requests from a user 104.

User emails can be stored in one or more on-site or remote databases 112 on storage medium 114, and can be arranged in one or more folders 116. It can be understood that the arrangements of the user emails into folders 116 of FIG. 1 can be shown for illustrative purposes and that the emails can also be stored in databases 112 in the form of indexed lists, and/or other arrangements as may be known in the art. System 100 can include a module 118, operating independently or as part of a server 110, for processing a user request to download one or more emails to storage medium 120 of local system 108, or to other storage medium 122 remote from system 100.

Figure 2:
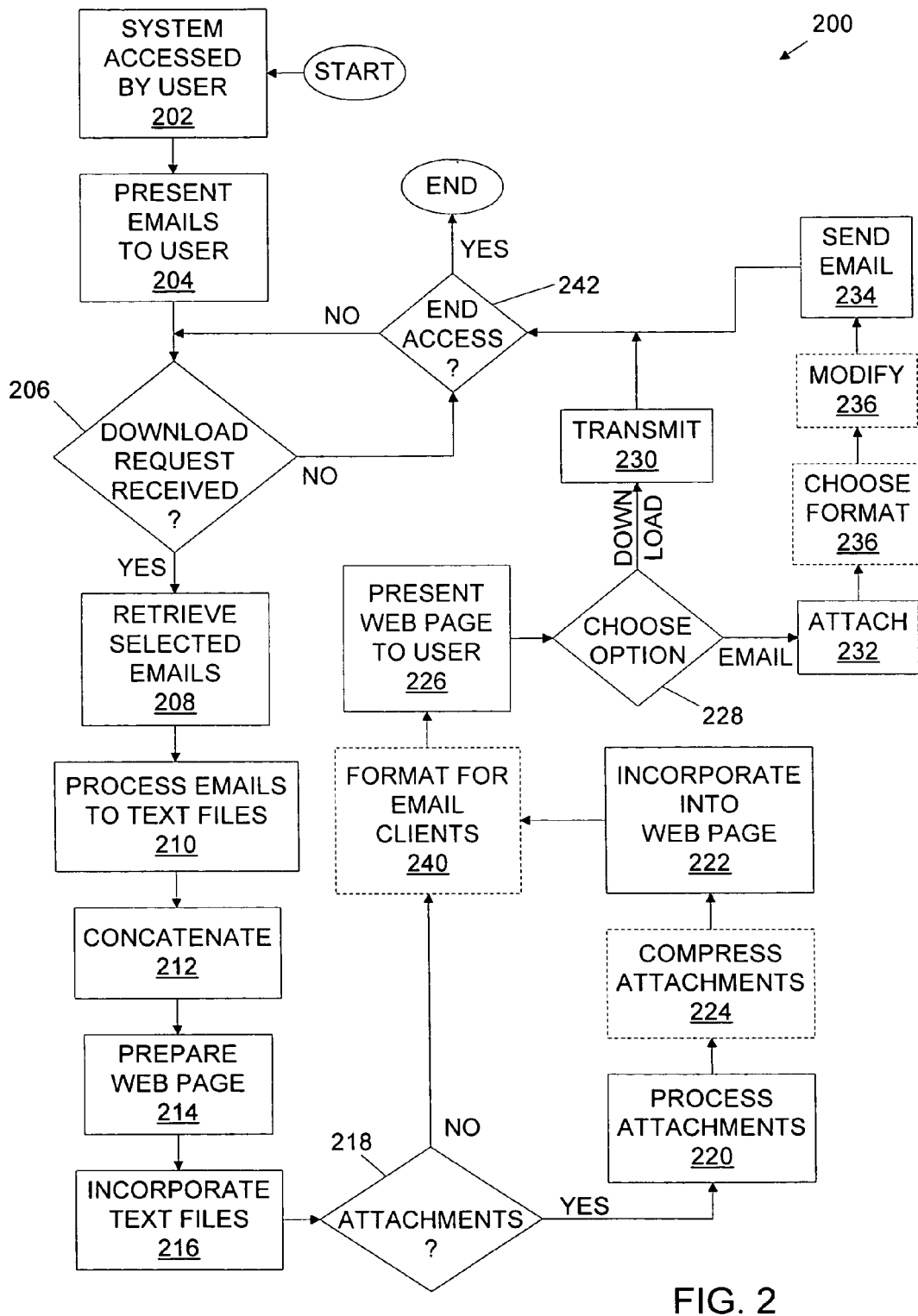
FIG. 2 illustrates a flow chart of a method of implementing local back-up in the system of FIG. 1.

FIG. 2 illustrates a flow chart for a method 200 of implementing a web-based email system, such as system 100, to provide for downloading of emails from system 100. Method 200 can start when user 104 accesses system 100, as at 202. System 100 can present (204) user 104 with a listing of emails in one or more folders, as designated by user 104. As is known in the art, the emails can be categorized into a number of folders 116 for presentation to user 104, such as an inbox folder, sent folder, and/or other categorized folders of the user's or another's (e.g., a system administrator's) choosing.

User 104 can initiate a download request by choosing a "download" option from the user interface presented to user 104 by system 100. The download option can be chosen by user 104 from a menu of options, or by clicking on an icon or action button, or by other means. It can be understood that in choosing the download option, user 104 can select the emails to be downloaded, e.g., by highlighting the emails to be downloaded, or otherwise designating the emails. When system 100 receives the request from user 104 to download the emails, as determined at 206, module 118 can retrieve (208) the selected emails from databases 112.

Using file conversion applications, module 118 can process (210) the retrieved emails into text files. In one embodiment, module 118 can concatenate the text files for the retrieved emails into a single text file, as at 212. Module 118 can prepare (214) a web page that can incorporate (216) the text files in a downloadable form. If the retrieved emails include attachments, as determined at 218, the attachments can be processed (220) and incorporated (222) into the web page in a downloadable form by module 118. Optionally, and depending on user selected criteria, preferences input by user 104, and/or system 100 default criteria, module 118 can process the email attachments into one or more compressed files, as indicated in phantom at 224.

The web page prepared by module 118 can be presented to user 104, as at 226. When user 104 selects to download the text file and attachments from the web page, as determined at 228, module 118 can transmit (230) the text file and attachments to local system 108. In addition to allowing downloading the text file and attachments, the web page can provide an option for user 104 to email the text file and attachments to one or more email addresses chosen by user 104. If the email option is chosen, as also determined at 228, module 118 can attach (232) the text file and attachments to an email originated by system 100 and send (234) the email to the email address designated by user 104. Optionally, user 104 can choose (236) a format for the email to which the text file and attachments can be attached and can edit or otherwise modify (238) the email prior to system 100 sending the email.

Method 200 can reduce the number of files being downloaded or emails being forwarded. Rather than downloading or forwarding each email separately, the emails can be concatenated into one or more text files. If the optional compression of the attachments is chosen, the attachments are compressed into one or more compressed files. Thus, rather than sending a number of separate emails, with separate attachments, method 200 can provide a single text file for the emails and a single compressed file for the attachments to be downloaded or forwarded.

Optionally, the downloadable forms of the text file and attachments can be formatted (shown in phantom at 240) to allow known email client applications, such as "Outlook" and "Eudora", products of Microsoft Corporation and QUAL-COMM Incorporated, respectively, to process the forms in the manner of normal emails. With such an email client operating on local system 108 (shown at 124 in FIG. 1), user 104 can browse, view, send and/or reply to the downloaded text file and attachments as user 104 would for other emails processed by email client 124. The method 200 can end when user 104 chooses to end access to system 100, as determined at 242. Otherwise, method 200 can continue to await a download request, as indicated at 206.

The systems and implementations thereof described herein may not be limited to particular components or configurations. For example, system 100 can be distributed among a number of network nodes that can communicate and cooperate to provide user 104 with a seamless interface experience. In addition, local system 108 can include devices capable of accessing system 100 through network 102, including personal computer, wireless phones, PDA's and the like. For example, user 104 can access system 100 using a web-enabled wireless phone (not shown) included within system 108, and can email the text file and attachments to a home computer for archiving on storage medium 122.

System 100 can include processors, e.g., servers 110, volatile memory and non-volatile memory, e.g., storage medium 114, for storing messages, user data, subscriber or user 104 data and other data corresponding to input and output values and other intermediate computations for the method 200. The memory can include instructions for executing the method 200, which can be transferred, in the course of operation, from the non-volatile memory to the volatile memory and to the processor for execution. The systems and methods can operate on a variety of networks, including networks supporting the Internet Protocol (IP), broadband networks, DSL (Digital Subscriber Line), FTTP (Fiber to the Premise), and WiFi (a wireless network specification).

Additionally, the flow chart in FIG. 2 can illustrate an exemplary implementation of system 100 and other configurations can be contemplated and/or other actions, decisions, menus and the like can be included. For example, while awaiting to receive a download request at 206, method 200 can process other user 104 requests, such as viewing and sending emails, as are known for web-based email systems.

The systems and methods described herein may not be limited to a particular hardware or software configuration; they may find applicability in many computing or processing environments. They can be implemented in hardware or software, or a combination thereof. Preferably, the method 200 can be implemented in computer programs running in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, including a non-transitory computer-readable medium, configured with a computer program, where the storage medium so configured can cause a computer to operate in a specific and predefined manner.

References to "microprocessor" and/or "processor" can be understood to include one or more microprocessors that can communicate in a stand-alone and/or a distributed environment(s), and can thus can be configured to communicate via wired or wireless communications with other processors, where such processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of transmitting a plurality of emails from a web-based email system, comprising:
    employing a file conversion application to process the plurality of emails into text files;
    concatenating the text files to provide at least one concatenated file;
    processing attachments of the plurality of emails into at least one compressed file, wherein the attachments are processed independently from the text files such that the at least one compressed file is separate from the at least one concatenated file
    presenting a web page including the at least one concatenated file and/or the at least one compressed file in downloadable form associated with a download option and/or an email option for the at least one concatenated file and/or the at least one compressed file;
    receiving an input indicating a selection of the download option or the email option; and
    transmitting the at least one concatenated file according to the selection,
    wherein the downloadable form of the at least one concatenated file and/or the at least one compressed file is formatted to allow email client applications to process the downloadable form in a manner similar to normal emails, whereby an email client operating on a local system can browse, view, send and/or reply to downloaded text files and/or attachments respectively associated with the at least one concatenated file and/or the at least one compressed file as a user would for other emails processed by the email client.

2. The method of claim 1, wherein the web page incorporates in downloadable form the at least one concatenated file.

3. The method of claim 1, wherein the web page incorporates in downloadable form the at least one compressed file.

4. The method of claim 1, wherein transmitting according to the selection of the download option comprises:
    transmitting the at least one compressed file to a system external to the web-based email system.

5. The method of claim 1, wherein transmitting according to the selection of the email option comprises:
    attaching the at least one concatenated file to an email generated by the web-based email system and transmitting the email to at least one email address.

6. The method of claim 5, wherein transmitting according to the selection of the email option comprises attaching the at least one compressed file to the email prior to transmitting.

7. The method of claim 5, comprising modifying the email prior to transmitting.

8. The method of claim 1, comprising formatting the at least one concatenated file or the at least one compressed file into a form executable by an email client application.

9. The method of claim 1, wherein the at least one compressed file is obtained by processing the attachments according to a received preferences input.

10. A method of archiving and transmitting emails, comprising:
    designating at least two of the emails to be archived to obtain designated emails;
    processing the designated emails with a file conversion application to obtain text files therefrom;
    concatenating the text files to obtain a concatenated file;
    processing attachments of the designated emails into a compressed file, wherein the attachments are processed independently from the text files such that the compressed file is separate from the concatenated file;
    generating a web page including the concatenated file and/or the compressed file in downloadable form associated with a download option and/or an email option for the concatenated file and/or the compressed file;
    receiving an input indicating a selection of the download option or the email option; and
    transmitting the concatenated file according to the selection,
    wherein the downloadable form of the concatenated file and/or the compressed file is formatted to allow email client applications to process the downloadable form in a manner similar to normal emails, whereby an email client operating on a local system can browse, view, send and/or reply to downloaded text files and/or attachments respectively associated with the concatenated file and/or the compressed file as a user would for other emails processed by the email client.

11. The method of claim 10, wherein the web page incorporates in downloadable form the concatenated file or the compressed file.

12. The method of claim 10, wherein
transmitting according to the selection of the download option comprises transmitting the at least one compressed file to a system external to a web-based email system, and
transmitting according to the selection of the email option comprises attaching the at least one concatenated file to an email generated by the web-based email system and transmitting the email to at least one email address.

13. The method of claim 10, comprising formatting the concatenated file or the compressed file into a form executable by an email client application.

14. The method of claim 10,
wherein designating the at least one of the emails is in response to receiving an indication of a selection of the at least one of the emails.

15. A non-transitory computer-readable medium containing instructions for controlling a computer system to transmit a plurality of emails from a web-based email system, the instructions controlling the computer system to:
process the plurality of emails with a set of file conversion instructions to convert the plurality of emails into text files;
concatenate the text files to provide at least one concatenated file;
process attachments of the plurality of emails into at least one compressed file, wherein the attachments are processed independently from the text files such that the at least one compressed file is separate from the at least one concatenated file;
present a web page including the at least one concatenated file and/or the at least one compressed file in downloadable form associated with a download option and/or an email option for the at least one concatenated file and/or the at least one compressed file;
receive an input indicating a selection of the download option or the email option; and
transmit the at least one concatenated file according to the selection,
wherein the downloadable form of the at least one concatenated file and/or the at least one compressed file is formatted to allow email client applications to process the downloadable form in a manner similar to normal emails, whereby an email client operating on a local system can browse, view, send and/or reply to downloaded text files and/or attachments respectively associated with the at least one concatenated file and/or the at least one compressed file as a user would for other emails processed by the email client.

16. The computer-readable medium of claim 15, wherein the web page incorporates in downloadable form the concatenated file or the compressed file.

17. The computer-readable medium of claim 15, wherein the instructions for controlling the computer system to transmit the at least one concatenated file according to the selection of the download option comprises instructions to transmit the at least one compressed file to a system external to the web-based email system, and
wherein the instructions for controlling the computer system to transmit the at least one concatenated file according to the selection of the email option comprises instructions to attach the at least one concatenated file to an email generated by the web-based email system and transmit the email to at least one email address.

18. A web-based email application on non-transitory computer-readable medium, the application comprising instructions to transmit emails from a storage medium associated with the web-based email application to a storage medium associated with a processing system controlled by a user of the web-based email application, the application transmitting the emails by:
using a set of file conversion instructions to process the emails into text files;
concatenating the text files to obtain a concatenated file;
processing a plurality of attachments of the emails into a compressed file, wherein the plurality of attachments are processed independently from the text files such that the compressed file is separate from the concatenated file;
generating a web page including a download option and/or an email option for at least one of the concatenated file and the compressed file;
incorporating the concatenated file and/or the compressed file into the web page in downloadable form;
receiving an input indicating a selection of the download option or the email option; and
transmitting at least one of the concatenated file and the compressed file according to the selection,
wherein the downloadable form of the concatenated file and/or the compressed file is formatted to allow email client applications to process the downloadable form in a manner similar to normal emails, whereby an email client operating on a local system can browse, view, send and/or reply to downloaded text files and/or attachments respectively associated with the concatenated file and/or the compressed file as a user would for other emails processed by the email client.

19. The web-based email application of claim 18, wherein
transmitting according to the selection of the download option comprises transmitting the at least one of the concatenated file and the compressed file to a system external to a web-based email system, and
transmitting according to the selection of the email option comprises attaching the at least one of the concatenated file and the compressed file to an email generated by the web-based email system and transmitting the email to at least one email address.

* * * * *